United States Patent [19]
Sievers et al.

[11] 3,941,093
[45] Mar. 2, 1976

[54] PORTABLE FARROWING BED

[76] Inventors: Albert H. Sievers; Isabelle R. Sievers, both of R.R. No. 1, Fieldon, Ill. 62031

[22] Filed: Sept. 19, 1974

[21] Appl. No.: 507,615

[52] U.S. Cl. .................................................. 119/20
[51] Int. Cl.² ........................................... A01K 1/02
[58] Field of Search .......................... 119/20, 16, 15

[56] References Cited
UNITED STATES PATENTS
2,700,389  1/1955  Butcher et al. ................... 119/16 X FOREIGN PATENTS OR APPLICATIONS
1,180,993  11/1964  Germany ............................. 119/20

*Primary Examiner*—J. N. Eskovitz
*Attorney, Agent, or Firm*—Clarence A. O'Brien; Harvey B. Jacobson

[57] ABSTRACT

A farrowing bed for disposition within a hog house is provided and the bed comprises an elongated frame-like structure including a first pair of opposite side longitudinal members rigidly interconnected at corresponding opposite ends and adapted to rest upon the floor of a hog house. A second pair of opposite side longitudinal members generally paralleling and rigidly supported at their opposite ends from the first pair of longitudinal members at an elevation thereabove and with the second pair of members spaced slightly outwardly of remote sides of vertical planes containing the first pair of members are also included in the framework. Further, a third pair of longitudinal members supported at their opposite ends from the first pair of members in positions spaced outwardly of remote sides of the second pair of members are further included in the framework and may oppose, along their remote sides, the opposite inner surfaces of the side walls of a hog house in which the bed is disposed. By disposition of the farrowing bed within the hog house which is approximately five feet wide and six feet long a sow is maintained in the center of the hog house and the pigs are protected from the sow when they are disposed along the sides of the hog house outwardly of the aforementioned first and second pairs of longitudinal members. The third pair of members assist in maintaining the farrowing bed in centered position within the hog house although opposite ends of the frame-like frame defined by the farrowing bed may be anchored to front and rear wall portions of the hog house if desired. In addition, the aforementioned third pair of longitudinal members prevent a sow from gaining access to the opposite side areas of the interior of an associated hog house disposed outwardly of the second pair of longitudinal members.

7 Claims, 4 Drawing Figures

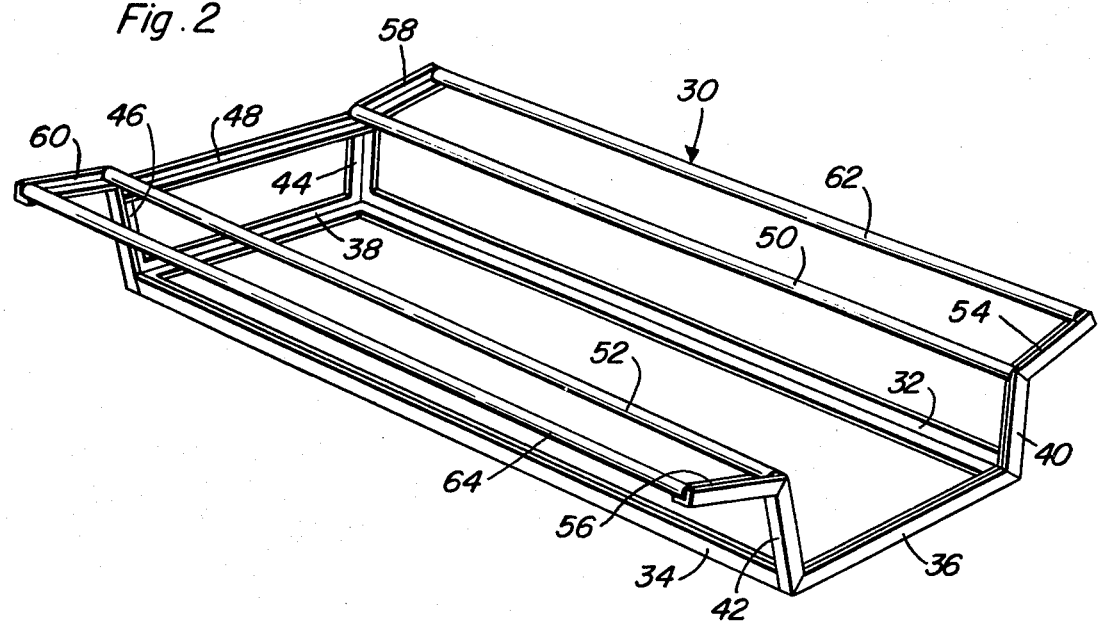
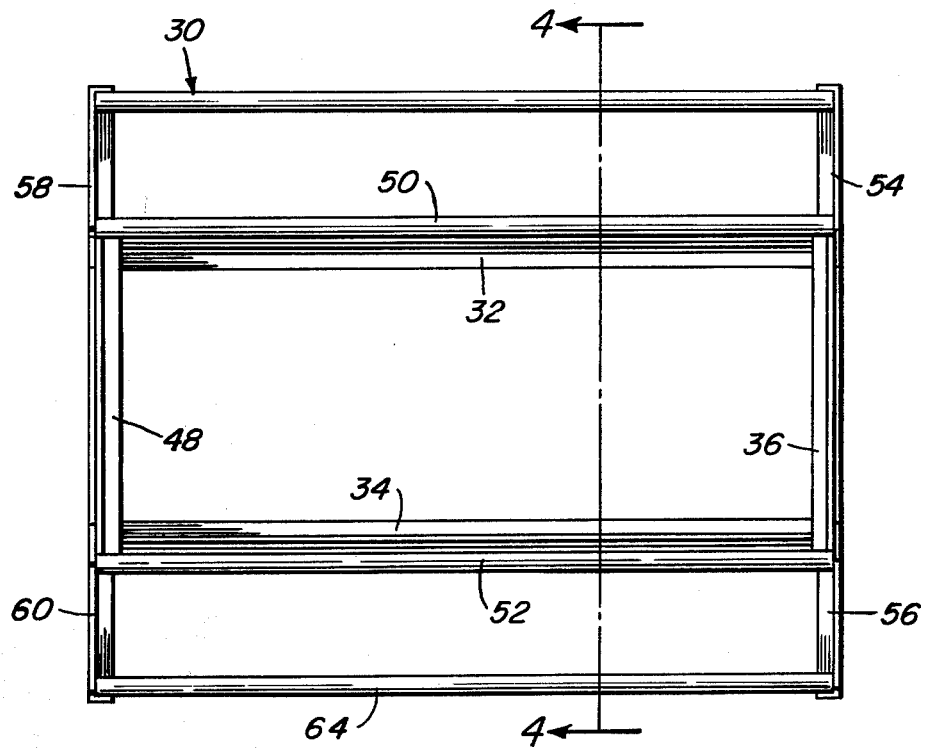

PORTABLE FARROWING BED

BACKGROUND OF THE INVENTION

When a plurality of five to ten sows are in a pasture with their pigs problems arise when the sows farrow in that several sows will attempt to farrow in two or three hog houses with the result that the hog houses are crowded and some of the pigs are forced into hog houses without sows. These pigs can become chilled without the body heat of a sow in the hog house. Further, pigs, during the time from farrowing to weaning time, often become injured as a result of movement of a heavy sow within a hog house into the areas of the hog house occupied by several pigs.

Although various types of structures have been heretofore designed to accommodate sows and to prevent sows from crushing pigs when farrowing these previously designed structures have, for the most part, proven ineffective in certain areas of operation.

Examples of previously patented structures of these types may be found in U.S. Pat. Nos. 2,602,419, 2,993,471, 2,966,883, 3,106,188 and 3,237,600.

BRIEF DESCRIPTION OF THE INVENTION

The portable farrowing bed is designed for disposition within a hog house having a length of approximately six feet and a width of approximately five feet. The farrowing bed is provided to exclude the entrance of more than one hog into the hog house and to also prevent the hog from occupying opposite side portions of the hog house whereby these portions of the hog house comprise areas in which pigs within the house will be protected against injury by a sow.

The main object of this invention is to provide a portable farrowing bed that may be readily disposed within a hog house of conventional dimensions for the purpose of protecting pigs from farrowing time to weaning time.

Another object of this invention is to provide a farrowing bed for disposition within a hog house and which is constructed in a manner to preclude the entrance of more than one sow into the hog house at a time.

A still further object of this invention, in accordance with the immediately preceding object, is to provide a farrowing bed which will allow a sow within an associated hog house to turn around within the hog house.

Yet another object of this invention is to provide a farrowing bed which may be utilized in conjunction with substantially any standard size hog house.

A final object of this invention to be specifically enumerated herein is to provide a portable farrowing bed which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numereals refer to like parts throughout.

BRIEF DESCRIPTION OF THE DRAWINGS

FIG. 2 is a perspective view of the frame-like farrowing bed of the instant invention;

FIG. 3 is a top plan view of the farrowing bed; and

DETAILED DESCRIPTION OF THE INVENTION

Figure 1:
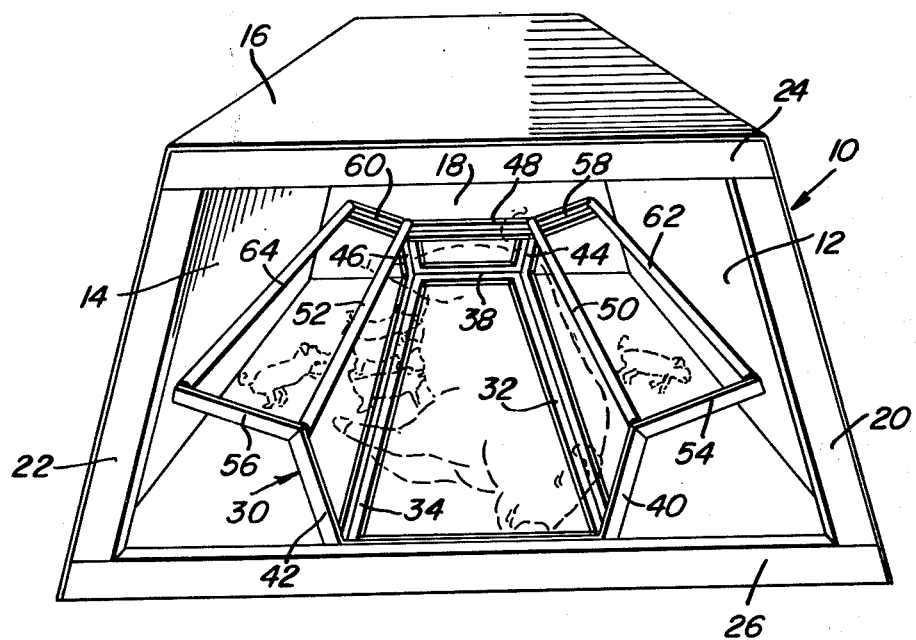
FIG. 1 is a front perspective view of a conventional form of hog house with the farrowing bed of the instant invention disposed therein.
Figure 4:
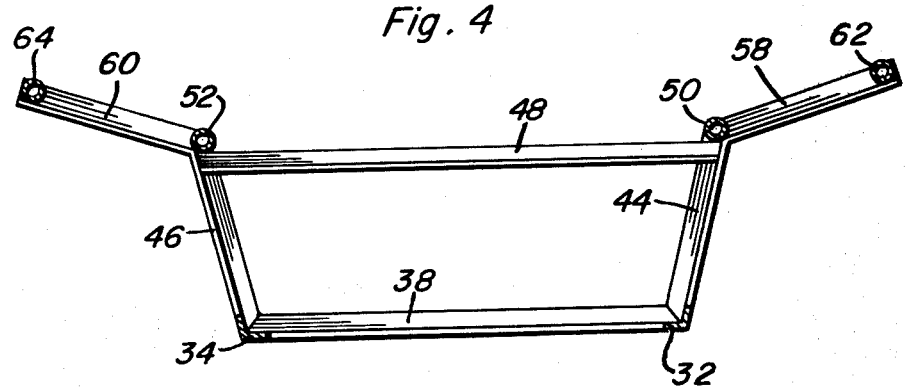
FIG. 4 is a transverse vertical sectional view taken substantially upon the plane indicated by the section line 4-4 of FIG. 3.

Referring now more specifically to the drawings, the numeral 10 generally designates a conventional form of hog house including upstanding upwardly convergent opposite side walls 12 and 14 interconnected along their upper marginal edge portions by means of a top wall 16 extending therebetween. The rear end of the hog house 10 is closed by means of a rear wall 18 and the front end of the hog house 10 includes upstanding opposite side framing members 20 and 22 interconnected at their upper ends by means of an upper transverse framing member 24 and at their lower ends by means of a lower transverse framing member 26 adapted, together with the lower marginal edge portions of the side walls 12 and 14 and the rear walls 18, to rest upon the ground.

The farrowing bed of the instant invention is referred to in general by the reference numeral 30 and includes a first pair of opposite side elongated longitudinal members 32 and 34 comprising upwardly and inwardly opening angle members and interconnected at corresponding front and rear ends by means of front and rear lower transverse members 36 and 38 which also comprise angle members, the angle members 36 and 38 opening upwardly and inwardly toward each other.

The lower ends of a pair of upstanding and slightly upwardly divergent angle members 40 and 42 are rigidly secured to the forward ends of the longitudinal members 32 and 34 and the corresponding opposite ends of the front transverse member 36. In addition, a corresponding pair of rear upstanding angle members 44 and 46 which are slightly upwardly divergent are rigidly secured to the rear ends of the longitudinal members 32 and 34 and the corresponding opposite ends of the rear transverse member 38.

An upper rear transverse angle member 48 is rigidly connected between the upper end portions of the rear members 44 and 46 and a pair of second longitudinal members 50 and 52 comprising tubular pipe members are supported from and extend between the upper ends of the members 40 and 42 and the opposite ends of the upper transverse member 48.

The front end of the bed 30 further includes a pair of outwardly projecting and slightly outwardly and upwardly inclined support members 54 and 56 whose inner lower ends are rigidly attached to the upper ends of the angle members 40 and 42. Also, the rear end of the bed 30 includes a pair of similar outwardly projecting and slightly upwardly and outwardly inclined support members 58 and 60 whose inner lower ends are rigidly anchored to the upper ends of the members 44 and 46.

A third pair of longitudinal members slightly elevated in relation to the second longitudinal members 50 and 52 extend between the outer ends of the support members 54 and 56 and the support members 58 and 60, the third pair of longitudinal members being designated by the reference numerals 62 and 64 and also comprising tubular pipe members.

Opposite ends of the forward lower transverse member 36 may be provided with forwardly projecting studs for securement through the lower frame member 26 of the hog house 10, if desired. However, the remote sides of the third pair of longitudinal members 62 and 64 oppose the inner surfaces of the side walls 12 and 14 of the hog house 10 and therefore serve to maintain the farrowing bed 30 in approximate centered position within the hog house 10.

The second pair of longitudinal members 50 and 52 are disposed on remote sides of vertical longitudinal planes containing the first pair of longitudinal members 32 and 34 and in this manner sufficient protection along the side walls 12 and 14 of the hog house is afforded for pigs within the hog house 10. However, the spacing between the second pair of longitudinal members 50 and 52 is such that a sow disposed therebetween may turn around within the hog house 10. Further, the third pair of longitudinal members 62 and 64 prevent a sow from gaining access behind the second pair of longitudinal members 50 and 52 and getting bedding from the pigs in the opposite side portions of the hog house 10. The latter is a very important feature of the instant invention in that there is a natural tendency for sows to rake straw or bedding into a pile and then lay on it. At times, when she is farrowing, she rakes bedding, pigs and anything else that may be within her reach into a pile and lays on it. Also, although the longitudinal members 50 and 52 are spaced apart sufficiently to enable a sow to turn around within the house 10, the longitudinal members 50 and 52 tend to make the sow lay down on her stomach instead of falling heavily on one side and possibly on some of her pigs. Of course, the interior side portions of the hog house 10 disposed outwardly of the first and second longitudinal members 32, 34, 50 and 52 are those areas within the house 10 in which pigs are reasonably safe against injury by the sow.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable farrowing bed for disposition within a hog house, said bed being elongated and including a first pair of opposite side longitudinal members rigidly interconnected at corresponding opposite ends and adapted to rest upon the floor of a hog house, a second pair of opposite side longitudinal members generally paralleling and rigidly supported at their opposite ends from said first pair of longitudinal members at a first elevation thereabove and with said second pair of members spaced slightly outwardly of remote sides of vertical planes containing said first pair of members, and a third pair of longitudinal members supported at their opposite ends from said first pair of members in positions spaced outwardly of remote sides of said second pair of members, said third pair of members being adapted to abut, along their remote sides, the opposing inner surfaces of the side walls of a hog house in which said bed is disposed, a horizontal transverse member extending and secured between one pair of corresponding ends of said second longitudinal members.

2. The combination of claim 1 wherein said third longitudinal members are spaced slightly above a generally horizontal plane containing said second pair of members.

3. The combination of claim 1 wherein said second pair of longitudinal members comprise cylindrical members.

4. The combination of claim 4 including a pair of horizontal transverse members extending and rigidly secured between said corresponding opposite ends of said first longitudinal members by which the latter are rigidly interconnected.

5. A portable farrowing bed for disposition within a hog house, said bed being elongated and including a first pair of opposite side longitudinal members rigidly interconnected at corresponding opposite ends and adapted to rest upon the floor of a hog house, a second pair of opposite side longitudinal members generally paralleling and rigidly supported at their opposite ends from said first pair of longitudinal members at a first elevation thereabove and with said second pair of members spaced slightly outwardly of remote sides of vertical planes containing said first pair of members, and a third pair of longitudinal members supported at their opposite ends from said first pair of members in positions spaced outwardly of remote sides of said second pair of members, said third pair of members being adapted to abut, along their remote sides, the opposing inner surfaces of the side walls of a hog house in which said bed is disposed, a pair of opposite side upstanding and upwardly divergent upright members at each end of said bed, the lower ends of each pair of upright members being ridigly secured to the corresponding ends of said first pair of elongated members, the upper ends of each pair of upright members being rigidly secured to the corresponding ends of said second pair of elongated members.

6. The combination of claim 5 wherein said third longitudinal members are spaced slightly above a generally horizontal plane containing said second pair of members.

7. The combination of claim 6 including a horizontal transverse member extending and secured between one pair of corresponding ends of said second longitudinal members.

* * * * *